(12) United States Patent
Jalal et al.

(10) Patent No.: US 11,483,260 B2
(45) Date of Patent: Oct. 25, 2022

(54) DATA PROCESSING NETWORK WITH FLOW COMPACTION FOR STREAMING DATA TRANSFER

(71) Applicant: Arm Limited, Cambridge (GB)

(72) Inventors: Jamshed Jalal, Austin, TX (US); Tushar P Ringe, Austin, TX (US); Phanindra Kumar Mannava, Austin, TX (US); Dimitrios Kaseridis, Austin, TX (US)

(73) Assignee: Arm Limited, Cambridge (GB)

( * ) Notice: Subject to any disclaimer, the term of this patent is extended or adjusted under 35 U.S.C. 154(b) by 52 days.

(21) Appl. No.: 17/051,028

(22) PCT Filed: May 2, 2019

(86) PCT No.: PCT/GB2019/051217
§ 371 (c)(1),
(2) Date: Oct. 27, 2020

(87) PCT Pub. No.: WO2019/211611
PCT Pub. Date: Nov. 7, 2019

(65) Prior Publication Data
US 2021/0126877 A1  Apr. 29, 2021

(30) Foreign Application Priority Data

May 3, 2018 (GR) .............................. 20180100189

(51) Int. Cl.
*H04L 49/50* (2022.01)
*G06F 13/36* (2006.01)
(Continued)

(52) U.S. Cl.
CPC ............ *H04L 49/501* (2013.01); *G06F 13/36* (2013.01); *H04L 47/11* (2013.01); *H04L 49/15* (2013.01); *H04L 49/25* (2013.01)

(58) Field of Classification Search
CPC ....... H04L 49/501; H04L 47/11; H04L 49/15; H04L 49/25; G06F 13/36;
(Continued)

(56) References Cited

U.S. PATENT DOCUMENTS 9,106,229 B1 * 8/2015 Hutton .................. H01L 23/147
10,452,593 B1   10/2019 Jalal et al.
(Continued)

FOREIGN PATENT DOCUMENTS

EP        0818732 A3    3/1999

OTHER PUBLICATIONS

European Patent Office, International Search Report and Written Opinion, PCT/GB2019/051217, dated Jul. 19, 2019.

*Primary Examiner* — Jamal Javaid
*Assistant Examiner* — Shawn D Miller
(74) *Attorney, Agent, or Firm* — Leveque Intellectual Property Law, P.C.

(57) ABSTRACT

An improved protocol for data transfer between a request node and a home node of a data processing network that includes a number of devices coupled via an interconnect fabric is provided that minimizes the number of response messages transported through the interconnect fabric. When congestion is detected in the interconnect fabric, a home node sends a combined response to a write request from a request node. The response is delayed until a data buffer is available at the home node and home node has completed an associated coherence action. When the request node receives a combined response, the data to be written and the acknowledgment are coalesced in the data message.

18 Claims, 6 Drawing Sheets

(51) Int. Cl.
*H04L 47/11* (2022.01)
*H04L 49/15* (2022.01)
*H04L 49/25* (2022.01)

(58) Field of Classification Search
CPC ....... G06F 2212/1048; G06F 2212/154; G06F 12/0815
See application file for complete search history.

(56) References Cited

U.S. PATENT DOCUMENTS

| | | |
|---|---|---|
| 10,613,996 B2 | 4/2020 | Mannava et al. |
| 2002/0129211 A1 | 9/2002 | Arimilli et al. |
| 2009/0113139 A1 | 4/2009 | Pudipeddi et al. |
| 2010/0005246 A1 | 1/2010 | Beers et al. |
| 2011/0078384 A1 | 3/2011 | Kumar et al. |
| 2012/0079211 A1 | 3/2012 | Laycock et al. |
| 2013/0042038 A1* | 2/2013 | Byrne .................. G06F 13/362 710/310 |
| 2013/0042077 A1 | 2/2013 | Mannava et al. |
| 2013/0151929 A1 | 6/2013 | Dodson et al. |
| 2015/0178209 A1* | 6/2015 | Hollaway, Jr. ............ G06F 1/12 711/146 |
| 2015/0261677 A1 | 9/2015 | Malewicki |
| 2016/0179161 A1* | 6/2016 | Adler ...................... G06F 30/30 713/320 |
| 2019/0297018 A1* | 9/2019 | Dearth .................... H04L 43/16 |
| 2019/0342034 A1 | 11/2019 | Mannava et al. |

\* cited by examiner

DATA PROCESSING NETWORK WITH FLOW COMPACTION FOR STREAMING DATA TRANSFER

Data processing systems, such as a System-on-a-Chip (SoC) may contain multiple processor cores, multiple data caches and shared data resources. In a shared memory system for example, each of the processor cores may read and write to a single shared address space. Cache coherency is an issue in any system that contains one or more caches and more than one device sharing data in a single cached area. There are two potential problems with a system that contains caches. First, memory may be updated by another device after a cached device has taken a copy. At this point, the data within the cache is out-of-date or invalid and no longer contains the most up-to-date data. Second, systems that contain write-back caches must deal with the case where the device writes to the local cached copy at which point the memory no longer contains the most up-to-date data. A second device reading memory will see out-of-date data.

The data processing system may be arranged as a number of nodes coupled together via an interconnect system to form a network. One example of a protocol for maintaining cache coherency uses snoop requests. When a node of a network wishes to access data associated with a particular address, a snoop message is sent to other nodes that have a copy of requested data stored in a local cache.

Generally, coherence is maintained in a data processing system with shared resources by implementing a messaging protocol. Performance of the system is constrained by the message transporting capacity of the interconnect fabric and the number of messages required to complete each transaction. In some applications, such the streaming transfer of data via the interconnection, the interconnect fabric may become congested, thereby limiting performance of the system.

The accompanying drawings provide visual representations which will be used to more fully describe various representative embodiments and can be used by those skilled in the art to better understand the representative embodiments disclosed and their inherent advantages. In these drawings, like reference numerals identify corresponding elements.

Figure 1:
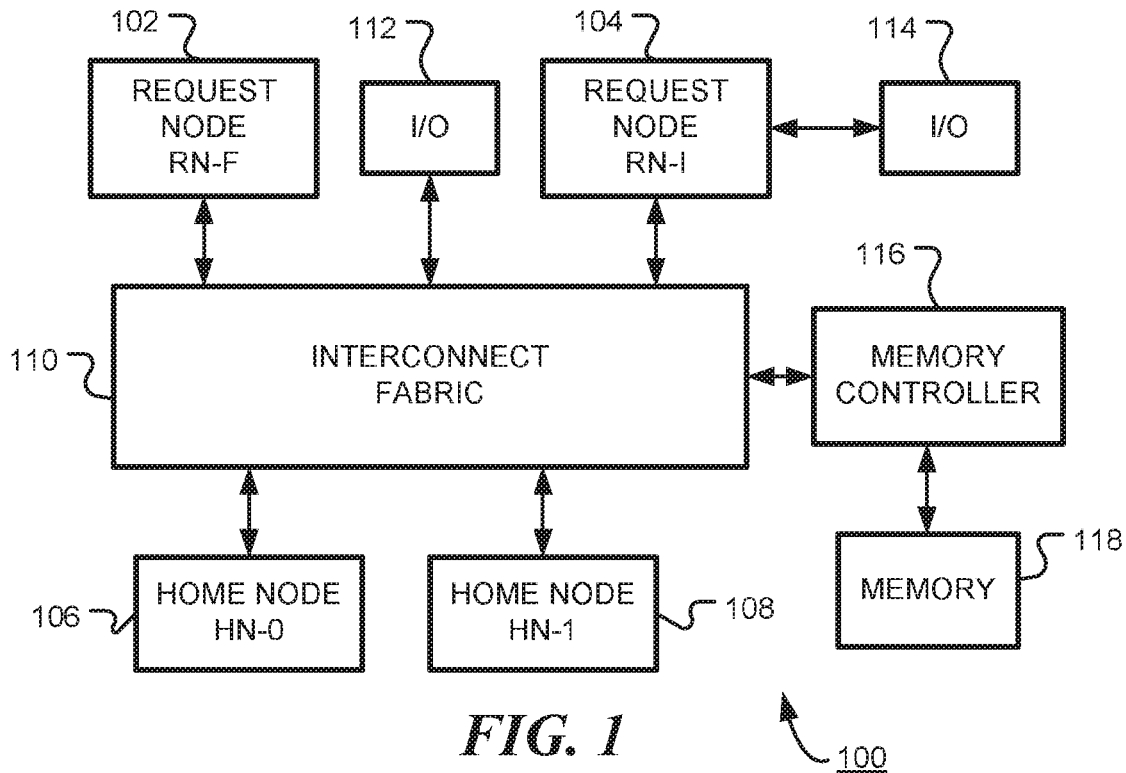
FIG. 1 is a block diagram of a data processing network, in accordance with various representative embodiments.

While this present disclosure is susceptible of embodiment in many different forms, there is shown in the drawings and will herein be described in detail specific embodiments, with the understanding that the present disclosure is to be considered as an example of the principles of the present disclosure and not intended to limit the present disclosure to the specific embodiments shown and described. In the description below, like reference numerals may be used to describe the same, similar or corresponding parts in the several views of the drawings.

In this document, relational terms such as first and second, top and bottom, and the like may be used solely to distinguish one entity or action from another entity or action without necessarily requiring or implying any actual such relationship or order between such entities or actions. The terms "comprises," "comprising," "includes," "including," "has," "having," or any other variations thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

Reference throughout this document to "one embodiment," "certain embodiments," "an embodiment," "implementation(s)," "aspect(s)," or similar terms means that a particular feature, structure, or characteristic described in connection with the embodiment is included in at least one embodiment of the present disclosure. Thus, the appearances of such phrases or in various places throughout this specification are not necessarily all referring to the same embodiment. Furthermore, the particular features, structures, or characteristics may be combined in any suitable manner in one or more embodiments without limitation.

The term "or" as used herein is to be interpreted as an inclusive or meaning any one or any combination. Therefore, "A, B or C" means "any of the following: A; B; C; A and B; A and C; B and C; A, B and C." An exception to this definition will occur only when a combination of elements, functions, steps or acts are in some way inherently mutually exclusive. Also, grammatical conjunctions are intended to express any and all disjunctive and conjunctive combinations of conjoined clauses, sentences, words, and the like, unless otherwise stated or clear from the context. Thus, the term "or" should generally be understood to mean "and/or" and so forth.

All documents mentioned herein are hereby incorporated by reference in their entirety. References to items in the singular should be understood to include items in the plural, and vice versa, unless explicitly stated otherwise or clear from the text.

Recitation of ranges of values herein are not intended to be limiting, referring instead individually to any and all values falling within the range, unless otherwise indicated, and each separate value within such a range is incorporated into the specification as if it were individually recited herein. The words "about," "approximately," "substantially," or the like, when accompanying a numerical value, are to be construed as indicating a deviation as would be appreciated by one of ordinary skill in the art to operate satisfactorily for an intended purpose. Ranges of values and/or numeric values are provided herein as examples only, and do not constitute a limitation on the scope of the described embodiments. The use of any and all examples, or exemplary language ("e.g.," "such as," or the like) provided herein, is intended merely to better illuminate the embodiments and does not pose a limitation on the scope of the embodiments. No language in the specification should be construed as indicating any unclaimed element as essential to the practice of the embodiments.

For simplicity and clarity of illustration, reference numerals may be repeated among the figures to indicate corresponding or analogous elements. Numerous details are set forth to provide an understanding of the embodiments described herein. The embodiments may be practiced without these details. In other instances, well-known methods, procedures, and components have not been described in detail to avoid obscuring the embodiments described. The description is not to be considered as limited to the scope of the embodiments described herein.

In the following description, it is understood that terms such as "first," "second," "top," "bottom," "up," "down," "above," "below," and the like, are words of convenience and are not to be construed as limiting terms. Also, the terms apparatus and device may be used interchangeably in this text.

As utilized herein, the terms "coupled", "connected," and/or similar terms are used generically. It should be understood that these terms are not intended as synonyms. Rather, "connected" is used generically to indicate that two or more components, for example, are in direct physical, including electrical, contact; while, "coupled" is used generically to mean that two or more components are potentially in direct physical, including electrical, contact; however, "coupled" is also used generically to also mean that two or more components are not necessarily in direct contact, but nonetheless are able to co-operate and/or interact. The term "coupled" is also understood generically to mean indirectly connected, for example, in an appropriate context.

The various embodiments and examples of the present disclosure as presented herein are understood to be illustrative of the present disclosure and not restrictive thereof and are non-limiting with respect to the scope of the present disclosure.

Further particular and preferred aspects of the present disclosure are set out in the accompanying independent and dependent claims. Features of the dependent claims may be combined with features of the independent claims as appropriate, and in combinations other than those explicitly set out in the claims.

The present disclosure is directed towards achieving efficient data transfer in a data processing network, such as a System-on-a-Chip (SoC) by implementing a protocol that uses a reduced number response message. The protocol is implemented in hardware and reduces message congestion in the network interconnect fabric, thereby improving operation of the data processing network.

A data processing apparatus may use multiple processor devices inside a chip to scale up performance and reduce latency. A program or task can be broken down into independent steps that can be executed in parallel by multiple devices. When the devices need to share data or control information, they communicate with one another through an on-chip interconnect.

Data may be stored off-chip in a main memory (such as DRAM) which is slow to access and consumes a lot of power. Efficiency is improved by using local L2 caches in each processor device that are accessible by other on-chip processor devices. This speeds up the inter-processor communication and reduces power consumption. In addition, data may be received at a processing device from an input device or written from a processing device to an output.

However, with shared resources a mechanism is needed to ensure that any processor gets the latest data, rather than out-of-date or stale data. One approach is to use one or more home nodes in the interconnect to keep track of cache contents and manage memory access requests. A home node is a data handling module that can be considered to be within the interconnect or attached to it. Each home node manages requests for a region of the shared memory (or memory-mapped input/output (I/O) devices). A processing device sends data requests to the appropriate home node, and the home node manages how the request is processed. The processing device is referred to as a request node. The home node may serialize requests from all request nodes and execute them in serial order so as to maintain data coherency. The memory space is divided between home nodes.

When a request node wants to access data, it sends a request to the home node of the interconnect that is associated with that address. The home node maintains a record in the form of a snoop filter, for example, of which nodes have a copy of the cache line in a local cache and sends a message, called a snoop request, to the identified node or nodes (the target nodes) requesting the data. Data not stored in the local cache may be retrieved from the main memory via a memory controller, for example. A home node may itself be provided with a cache to reduce the number of memory accesses.

The interconnect may provide parallel channels for data, request/response message and snoop messages.

In accordance with embodiments of the disclosure, a data processing apparatus that includes a number of nodes coupled via an interconnect is configured to provide efficient transfer of data by reducing the number of messages required to maintain data coherency.

FIG. 1 is a block diagram of a data processing apparatus 100, in accordance with various embodiments. Data processing systems, such as a System-on-a-Chip (SoC), may contain multiple processing devices and shared data resources. The system 100 may be implemented in a System-on-a-Chip (SoC) integrated circuit, for example. In the simplified example shown, the system 100 is arranged as a network with a number of nodes connected together via an interconnect system. The nodes are functional blocks or devices, such as processors, I/O devices or memory controllers, for example. As shown, the devices include request nodes 102, 104 and home nodes 106 and 108. The devices couple to interconnect at cross-points of interconnect system 110. The cross points contain message buffers and switches that are used to route messages between devices. System 100 also includes input/output (I/O) devices 112 and 114. Other elements of the system have been omitted in FIG. 1 for the sake of clarity. A device may be, for example, a processing core, a cluster of processing cores, a graphics post processor (GPP), a digital signal processor (DSP), a field programmable gate array (FPGA) or an application specific integrated circuit (ASIC) device. In the example shown in FIG. 1, devices 102 (RN-F) and 104 (RN-I) are request nodes such as processors or processing clusters. Device 104 (RN-I) provides an interface to I/O device 114. For example, an Arm® AMBA® Advanced eXtensible Interface (AXI) specified by Arm Limited, U.K., may be provided to link with a Peripheral Component Interconnect (PCI) express enabled device. Devices 106 (HN-0) and 108 (HN-1) are home nodes that serve as points of coherency for designated system address ranges.

Devices 102 and 104 are coupled, via interconnect system 110, to home nodes (HNs) 106 and 108, to each other, and to data resources such as memory controller 116 for accessing shared memory 118. Devices 102, 104 are able to generate data access requests and are referred herein as request nodes (RNs). When multiple nodes share a data or memory resource, a coherent protocol may be used, and devices may be referred to as fully coherent (e.g. RN-F).

Other devices (e.g. RN-I) may provide connections to another integrated circuit. Note that many elements of a SoC, such as clocks, have been omitted from FIG. 1 for the sake of clarity.

Nodes that generate requests for data transactions, such as 'read' and 'write', for example, are referred to a request node and are end points for such transactions. Nodes that respond to the requests are referred to as target nodes. For example, in FIG. 1, devices 102 and 104 are request nodes and devices 106 and 108 are target nodes. When data requested by request nodes 102 and 104 is present at target node 106 or 108, it is passed back to the request node via interconnect system 110. When data is not present, it is retrieved from the appropriate resource. When data is written by a request node, the home node is responsible for ensuring that no copies of the original data remain at other locations in the system, as these copies will become out-of-date once the new data is written.

In a data transaction, the request node creates a message, comprising one or more packets, and injects it into the interconnect for transmission to its destination. A packet can contain a memory address, data from memory, or both, and may also hold control or routing bits. A control packet, such as a data read request, may contain only address information and control bits. In an on-chip network, a 'packet' is the meaningful unit of the upper-layer protocol, such as the cache-coherence protocol. When a packet size is larger than the channel width in the interconnect 110, the packet is broken into multiple pieces or beats, resulting in additional time for a total packet traversal. For example, if a packet is 256 bits, and the channel is 64 bits-per-cycle wide, the serialization is 4 cycles.

Cache coherency is an issue in any system that contains one or more caches, or other distributed storage, and more than one device sharing data in a single data resource. There are two potential problems with a system that contains caches. Firstly, memory may be updated by another device after a cached device has taken a copy. At this point, the data within the cache is out-of-date or invalid and no longer contains the most up-to-date data. Secondly, systems that contain write-back caches must deal with the case where the device updates the local cached copy, at which point the memory no longer contains the most up-to-date data. A second device reading memory will see out-of-date (stale) data. Cache coherency may be maintained through the exchange of 'snoop' messages between the processing devices, such as nodes 102, 104, for example. To maintain coherence, each processing device includes a snoop control unit that issues and receives coherence requests and responses, snoop messages, via the interconnect system 110 from other devices.

Snoop requests and responses are managed by the home nodes. Home nodes receive data access requests, generate corresponding snoop messages and receive or transfer data. The exchange of messages and data to ensure coherence is referred to as a coherence action.

Figure 2:
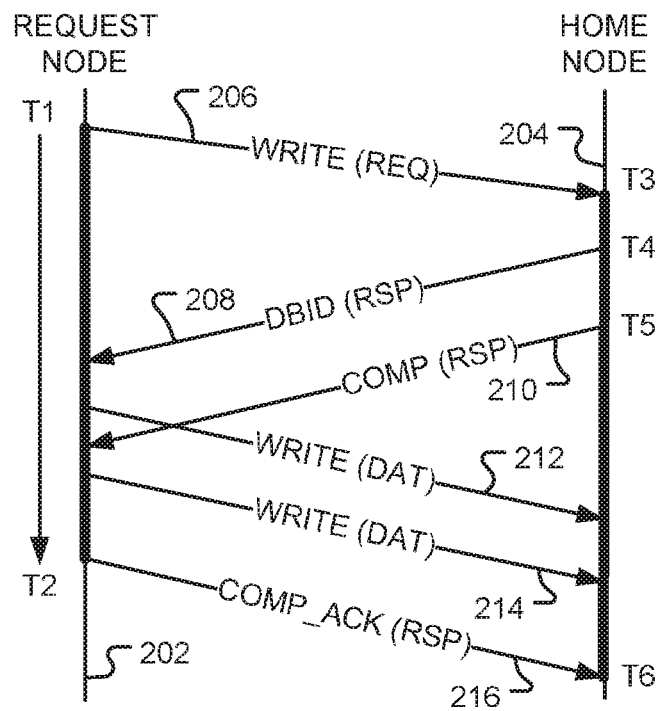
FIG. 2 and FIG. 3 are transaction flow diagrams for data write transactions in a data processing apparatus, in accordance with embodiments of the disclosure.

FIG. 2 is a flow diagram of an example write transaction between a request node, with timeline 202, and a home node, with timeline 204, in a system that has not been optimized. The transaction occupies the time interval T1-T2 in the request node and the time interval T3-T6 in the home node. A write request message 206 (WRITE (REQ)) is sent at time T1 from the request node to the home node via the interconnect system. In response to the request, which is received at time T3, the home node sends a first response message 208 (DBID (RSP)) back to the request node at time T4. Response message 208 indicates that a data buffer is available at the home node to receive the data and that completion of the write operation does not depend on any younger write operation. Response message 208 also indicates an identifier of the data buffer. In preparation for the write operation, the home node communicates with other nodes via snoop messages to maintain coherency by ensuring that no out-of-date data will be stored in local caches. When this coherence action is complete, the home node sends a second response message 210 (COMP (RSP)) at time T5 to indicate that the coherence action is complete. Once the DBID response 208 is received by the request node, the request node can send data to the home node as indicated by data beats 212 and 214. In this example, the data is transferred in two data beats. For example, a 64-byte transfer may be made using two data beats on a 32-byte interconnect data bus. Once all of the data has been sent, the request node sends COMP_ACK response message 216 to the home node to indicate completion of the transaction. Thus, three response messages (208, 210 and 216) are used to perform each write transaction.

The approach shown in FIG. 2 may be used for data streaming.

Figure 3:
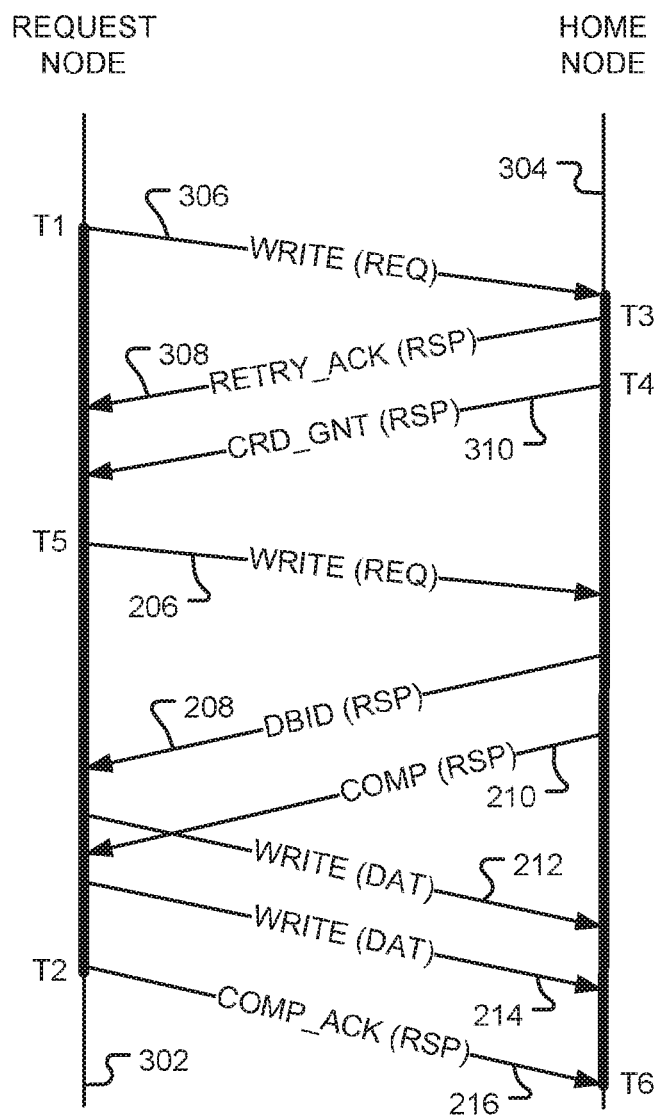

FIG. 3 is a flow diagram of an example write transaction between a request node, with timeline 302, and a home node, with timeline 304, in a system that has not been optimized. In this example, there is no data buffer available in the home node when write request 306 is received from the request node. The home node sends response message 308 (RE-TRY_ACK) to the request node at time T3 to indicate that no data buffer is available. At time T4, a data buffer becomes available at the home node and credit grant (CRD_GNT) response message 310 is sent to the request node to signal that write request may be retried. Messages 206, 208, 210, 212, 214 and 216 then proceed as described above with reference to FIG. 2. Thus, when retry is used, five response messages (308, 310, 208, 210 and 216) are used to perform each write transaction, in addition to two request messages (306, 206) and two data messages (212, 214).

From the description above, it is clear that flow of response messages in the interconnect fabric of a data processing system increase congestion. This is particularly true in the case of streaming data transfers. When congestion occurs, transactions take longer to complete and the resources of both the request node and home node are occupied for a greater time. As a result, performance of the data processing system is degraded. In addition, a large number of response messages may cause congestion. This puts pressure on other, unrelated, transactions since the response channel is shared with other devices in the system. The congestion results in a reduction of overall bandwidth as seen by all devices in the system.

Figure 4:
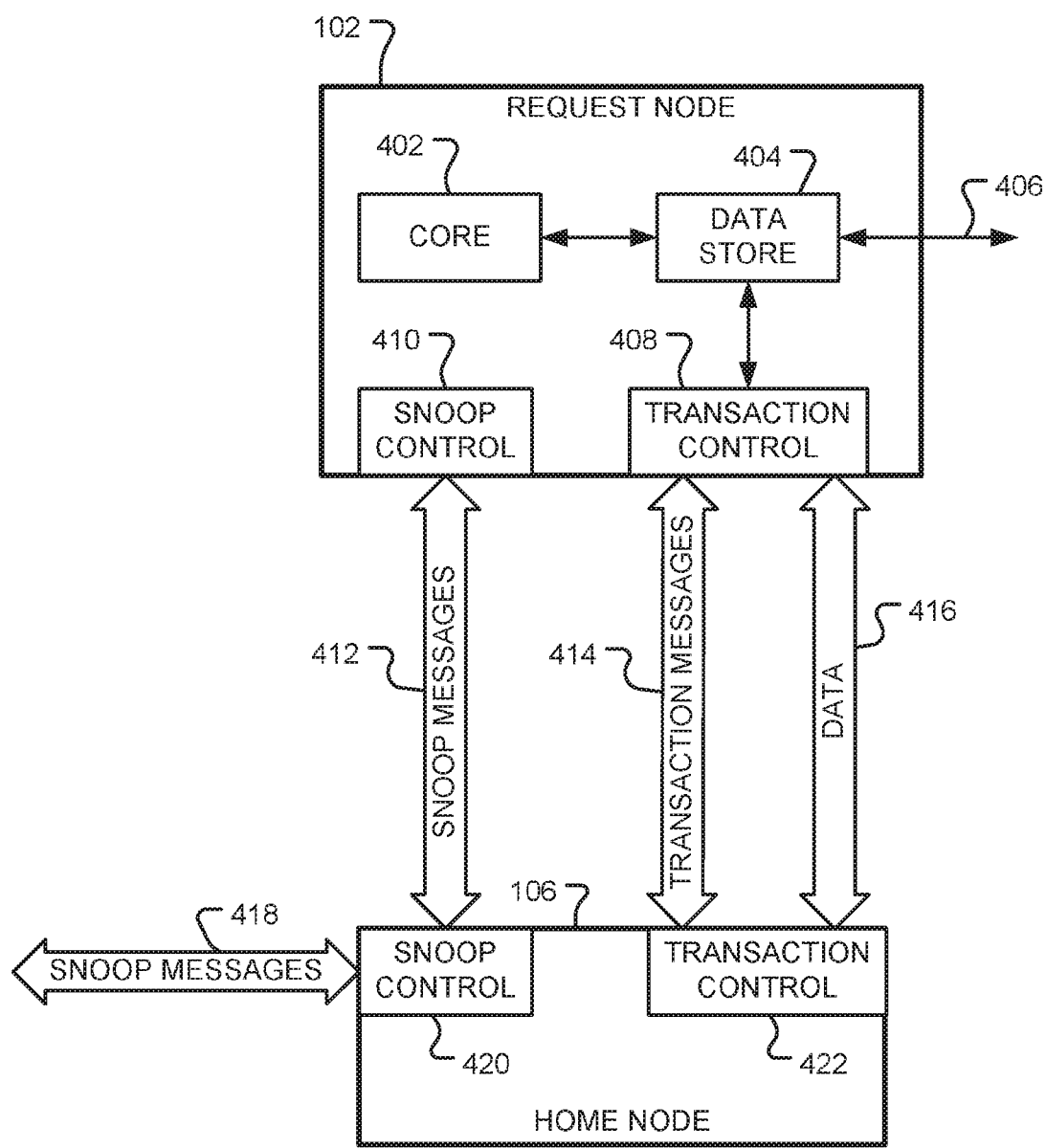
FIG. 4 is a diagram illustrating communication channels between nodes of a data processing network, in accordance with various representative embodiments.

FIG. 4 is a diagram showing communication between a request node 102 and a home node 106 in a data processing system, in accordance with embodiments of the disclosure. Request node 102 includes one or more processing cores 402 and a data store 404 (such as one or more caches and data buffers). Data store 404 may communicate with an external I/O device via link 406 to receive or transmit data and also communicates with core 402 and transaction controller 408. Request node 102 also includes a snoop controller 410. Snoop controller 410 exchanges snoop messages with home node 106 via link 412. These messages invoke the actions necessary to maintain coherence in the data processing system. Transaction controller 408 exchanges transaction messages 414 with home node 106 via link 414 and also exchanges data with home node 106 via data link 416. The links 412, 414 and 416 are provided by the interconnect fabric that couples devices in the data processing network. The links are virtual links since a particular message may take various paths through the interconnect.

Home node 106 executes coherence actions prior to a data access by sending and receiving snoop messages 418 with other devices in the data processing network using snoop controller 420. Home node 106 also includes a transaction controller 422 to exchange messages with the request node. Operation of the request node 102 and home node 106 is described below with reference to a write operation. In one embodiment, the operations are performed by the hardware of the transactions controllers 408 and 422.

Figure 5:
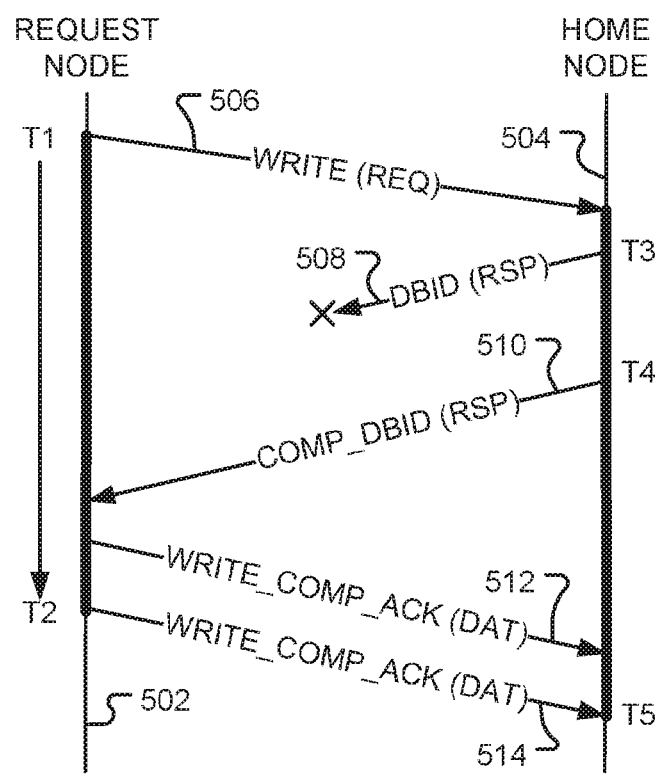
FIG. 5 is a transaction flow diagram for a data write transaction in a data processing apparatus, in accordance with embodiments of the disclosure.

FIG. 5 is a flow diagram of an example write transaction between a request node, with timeline 502, and a home node, with timeline 504, in accordance with embodiments of the disclosure. In accordance with an aspect of the disclosure, the request node and the home node work co-operatively to coalesce messages and thereby reduce the number of messages sent in either direction. The net result is a reduction of two in the number of messages sent in a write operation. This provides a large increase in bandwidth for streaming data writes.

The home node is configured to detect congestion in the transaction response channel of the interconnect fabric. This may be done, for example, by monitoring data buffer usage at network cross-points. When a cross-point has all data buffers in use, it is an indication that the network is congested, since new transfers will be delayed until a free buffer is available. Other methods for detecting interconnect congestion may be used without departing from the present disclosure. For example, a bi-polar predictor may be used to maintain a history of response channel backpressure, and heuristics used to determine when to combine response messages. Referring to FIG. 5, a write request 506 is received at the home node from a request node. At time T3 a data buffer is available to receive the write data. However, if the interconnect is congested at time T3, the DBID response message 508 is not sent. Rather, the message is delayed until, at time T4, the coherence action has been completed. At time T4, the COMP message and the DBID message are combined into a single message 510, denoted as COMP_DBID (RSP). Thus, the number of responses from the home node is reduced from two to one. When the request node receives message 510, it combines the write data message and COMP_ACK message into one message on the data channel. The data and response, denoted as WRITE COMP_ACK (DAT) are sent as two beats (512 and 514) on the data channel of the interconnect. Thus, there is no need to send a separate COMP_ACK message on the response channel, thereby reducing traffic on the response channel of the interconnect. In addition, since no separate COMP_ACK message is sent, the transaction is completed sooner, freeing resources in the request node. Typically, a data beat contains a number of bits in addition to the data itself. These bits indicate metadata and routing information for example. In accordance with the present disclosure, a beat contains one or more bits that indicate the message COMP_ACK.

FIG. 5 illustrates an embodiment of a method of data transfer in a data processing network that is implemented when congestion is detected in the interconnect fabric. When no congestion is detected, the method shown in FIG. 2 (no retry) or FIG. 3 (with retry) may be used. When a write request is received, the home node determines the level of congestion in the interconnect and selects which protocol to use. When congestion is detected in the interconnect fabric, as shown in FIG. 5, a combined response (COMP_DBID) 510 is sent from the home node to the request node via the interconnect fabric. The response is not sent until a data buffer is available at the home node and home node has completed a coherence action. Combined response 510 may include an identifier of the data buffer and an indication that the coherence action is complete.

When the interconnect fabric is not congested, as shown in FIG. 2 and FIG. 3, the home node sends a first response (DBID) (208 in FIG. 2) to the request node via the interconnect fabric once the data buffer is available at the home node. The home node then sends a second response (COMP) (210 in FIG. 2) to the request node via the interconnect fabric once the home node has completed the coherence action to indicate that the coherence action is complete.

The home node response is received at the request node. When the response comprises the combined response (COMP_DBID) (510 in FIG. 5), the request node coalesces a completion acknowledge message with one or more beats of the data to be written to the home node to form one or more coalesced data beats and sends the one or more coalesced data beats (512 and 514) from the request node to the home node via the interconnect fabric. However, when the response comprises the first response, the data to be written is sent as one or more data beats (WRITE COMP_ACK) (212 and 214 in FIG. 2) from the request node to the home node via the interconnect fabric. The completion acknowledge message (216 in FIG. 2) is then sent.

Figure 6:
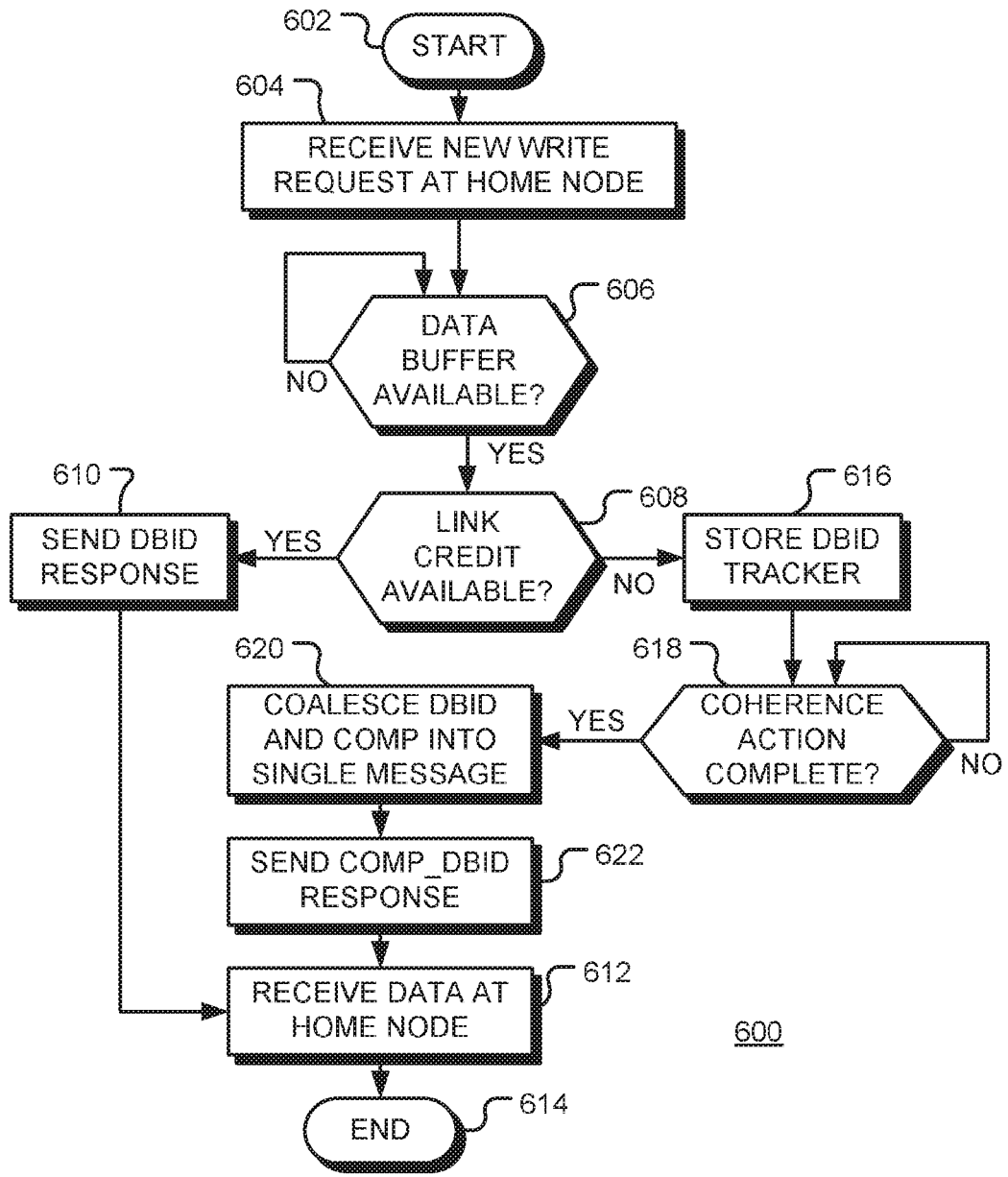
FIG. 6 is a flow chart of a method of operation of a home node in processing a data write transaction, in accordance with various representative embodiments.

FIG. 6 is a flow chart of a method 600 of operation of a home node for participation in a write operation, in accordance with embodiments of the disclosure. Following start block 602, a new write request is received at the home node at block 604. The home node waits at decision block 606 until a data buffer is available at the home node to receive data from the requesting node. When a data buffer is available, as depicted by the positive branch from decision block 606, the availability of link credit is checked at decision block 608. The availability of link credit is an indication of the level of congestion in the interconnect fabric. If link credit is available, as depicted by the positive branch from decision block 608, a DBID response message is sent to the requesting node at block 610. The DBID message identifies the data buffer which is available to receive the data from the requesting node. The home node then receives the write data at block 612 and the method ends at block 614. If there is no link credit available, as depicted by the negative branch from decision block 608, a tracker is stored for the data buffer identifier (DBID) at block 616. At block 618, the home node waits until the coherence action associated with the write request is complete (and link credit is available). When the coherence action is complete, as depicted by the positive branch from decision block 618, the DBID response and COMP response are combined into a single message at block 620 and sent to the request node at block 622. The home node then receives the write data at block 612 and the method ends at block 614.

In the embodiment shown in FIG. 6, the home node makes a decision whether to delay the DBID response and combine it the COMP response based on link credit availability. Optionally, the messages may always be combined. However, when the messages are combined, the coherence action and the action of writing data into the data buffer at the home node are performed in series. When separate DBID and COMP messages are sent, these two actions may be performed in parallel. Thus, in the embodiment shown in FIG. 6, the combining of messages is only used when the benefits or doing so (e.g. reducing interconnect congestion) outweigh the disadvantages (delayed write to the home node).

Figure 7:
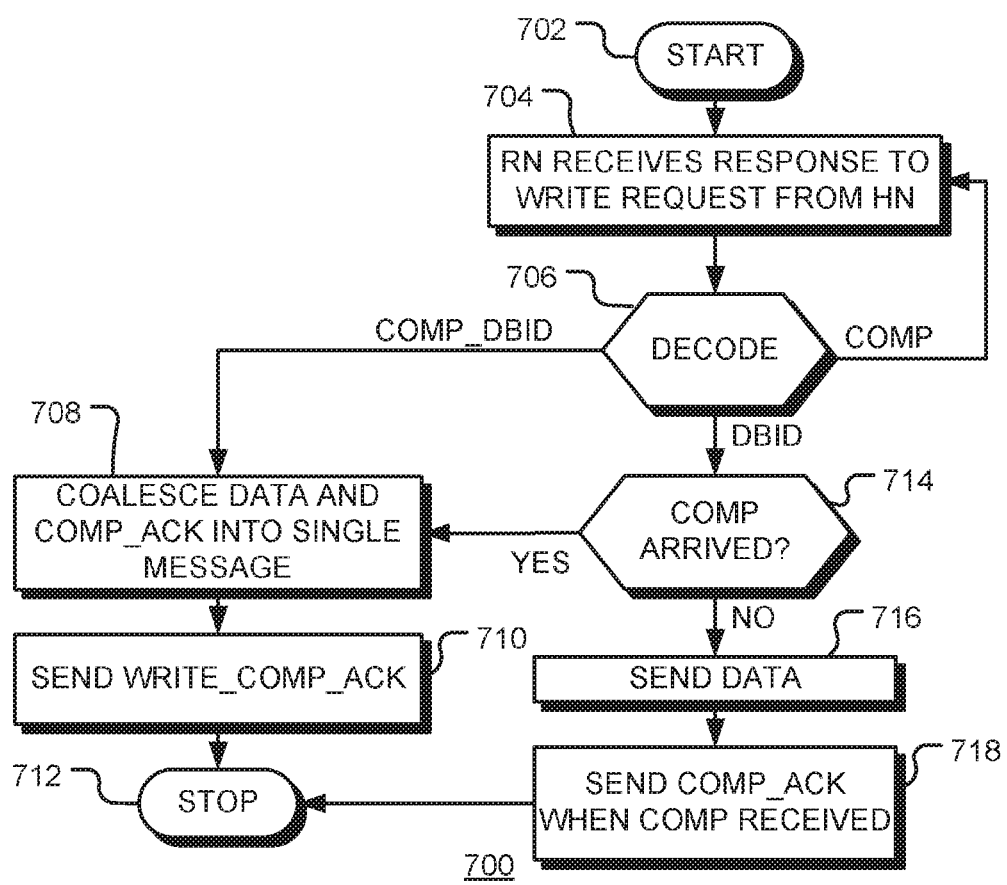
FIG. 7 is a flow chart of a method of operation of a request node in processing a data write transaction, in accordance with various representative embodiments.

FIG. 7 is a flow chart of a method 700 of operation of a request node to participate in a write operation, in accordance with embodiments of the disclosure. Following start block 702, the request node receives a response to a write request at block 704. The message is decoded at decision block 706. If the message is a COMP message, as depicted by the right branch from decision block 706, indicating that the coherence action has been completed by the home node, flow returns to block 704. If the response is the combined response COMP_DBID, as depicted by the left branch from decision block 706, the data to be written and the COMP_ACK response are combined at block 708. The combined WRITE COMP_ACK message is sent at block 710. The combined message may be sent over a data channel of the interconnect, thereby reducing traffic in the response channel of the interconnect. The method terminates at block 712. If the response is COMP_DBID, as depicted by the lower branch from decision block 706, flow continues to decision block 714. If the COMP message has been received by the request node, as depicted by the positive branch from decision block 714, flow continues to block 708 where the data and COMP_ACK message are combined. If the COMP message has not yet been received, as depicted by the negative branch from decision block 714, the data is sent from the request node to the home node at block 716. At block 718, a COMP_ACK is sent to the home once the COMP message has been received at the request node. The method terminates at block 712. It is noted that the COMP and DBID messages may arrive out of order, since they may take different routes through the interconnect.

Together, the actions of the home node, as shown in FIG. 6, and the request node, as shown in the FIG. 7, provide an embodiment of a protocol for efficient execution of a write operation in a data processing system. The protocol is performed by dedicated hardware in the home node and the request node.

The reduction in response messages is summarized in Table 1 below.

TABLE 1

|  | number of response messages in prior data flow | number of response messages in disclosed data flow | percentage reduction in response message traffic |
| --- | --- | --- | --- |
| with retry | 5 | 3 | 40% |
| without retry | 3 | 1 | 66% |

Other benefits of the disclosed approach are:
The tracker lifetime (the time taken for the complete transaction) in the home node is reduced since the COMP_ACK message is not sent as a separate message.
Under congestion conditions, the tracker lifetime in the request node is reduced since the COMP_ACK message is not sent as a separate message.
Under congestion conditions, traffic in the response channel of the interconnect is reduced and therefore available for other transactions.
Under congestion conditions, efficient utilization of the response channel results in improved system bandwidth.
Reduction of response messages in the interconnect results in lower power dissipation.

Those skilled in the art will recognize that the present disclosure may be implemented using dedicated hardware components. In addition, the present disclosure may be implemented using a programmed processor, reconfigurable hardware components, dedicated hardware components or combinations thereof.

Dedicated or reconfigurable hardware components may be described by instructions of a Hardware Description Language or by netlist of components and connectivity. The instructions or the netlist may be stored on non-transient computer readable medium such as Electrically Erasable Programmable Read Only Memory (EEPROM); non-volatile memory (NVM); mass storage such as a hard disc drive, floppy disc drive, optical disc drive; optical storage elements, magnetic storage elements, magneto-optical storage elements, flash memory, core memory and/or other equivalent storage technologies without departing from the present disclosure. Such alternative storage devices should be considered equivalents.

The various representative embodiments, which have been described in detail herein, have been presented by way of example and not by way of limitation. It will be understood by those skilled in the art that various changes may be made in the form and details of the described embodiments resulting in equivalent embodiments that remain within the scope of the appended claims.

One embodiment implements a method of data transfer in a data processing network comprising a home node and a request node coupled via an interconnect fabric. The method includes: receiving, by the home node, a write request from the request node; determining whether there is_congestion in the interconnect fabric; and when congestion in the interconnect fabric is determined: sending a combined response from the home node to the request node via the interconnect fabric when a data buffer is available at the home node and the home node has completed a coherence action, where the combined response comprises an identifier of the data buffer and an indication that the coherence action is complete.

The method may also include: receiving, by the request node, a response to the write request, the response sent from the home node via the interconnect fabric; and when the response comprises the combined response: coalescing, by the request node, a completion acknowledge message with one or more beats of the data to be written to the home node to form one or more coalesced data beats; and sending the one or more coalesced data beats from the request node to the home node via the interconnect fabric.

In addition, the method may also include: when congestion is not detected the interconnect fabric: sending a first response from the home node to the request node via the interconnect fabric when the data buffer is available at the home node, where the first response comprises an identifier of the data buffer; and sending a second response to the request node via the interconnect fabric when the home node has completed the coherence action, where the second response comprises an indication that the coherence action is complete.

The method may also include: when the response comprises the first response: sending the data to be written as one or more data beats from the request node to the home node via the interconnect fabric; and sending the completion acknowledge message from the request node to the home node via the interconnect fabric.

In response to the write request from the request node, the home node may perform a coherence action comprising exchanging, via the interconnect fabric, one or more snoop messages with other nodes of the data processing network.

In one embodiment, the write request is one of a plurality of write requests of a data streaming transaction.

In one embodiment, determining congestion in the interconnect fabric comprises detecting an availability of link credit in the interconnect fabric.

In one embodiment, determining congestion in the interconnect fabric comprises detecting an availability of data buffers in a cross point of the interconnect fabric.

Determining congestion in the interconnect fabric may be dependent upon a history of backpressure in a response channel of the interconnect fabric.

A further embodiment provides a data processing network comprising: a home node that provides a point of coherence for a range of region of memory, the home node comprising a first transaction controller; a request node comprising a second transaction controller; and an interconnect fabric that couples the request node to the home node, the interconnect fabric providing a data channel and a response channel between the first transaction controller and the second transaction controller; where the request node is configured to send a write request to the home node; and where the home node is configured for: identifying a data buffer of the home node for receiving data associated with the write request; detecting congestion in the response channel of the interconnect fabric; when congestion is detected in the response channel of the interconnect fabric: performing a coherence action associated with the write request; and sending a combined message to the request node, the combined message comprising an identifier of the identified data buffer, when the coherence action associated with the write request in complete.

The request node may also be configured for: receiving a response to the write request, the response sent from the home node via the interconnect fabric; and when the response comprises the combined message: coalescing, by the request node, a completion acknowledge message with one or more beats of data to be written to the home node to form one or more coalesced data beats; and sending the one or more coalesced data beats from the request node to the home node via the interconnect fabric.

The home node may also be configured for: when congestion is not detected in the response channel of the interconnect fabric: sending a data buffer identifier (DBID) message to the request node; performing a coherence action associated with the write request; and sending a coherence action complete (COMP) message to the request node when the coherence action associated with the write request is complete.

In addition, the request node may also be configured for: when the response comprises the DBID message: sending the data to be written as one or more data beats from the request node to the home node via the interconnect fabric; and sending the completion acknowledge message from the request node to the home node via the interconnect fabric subsequent to sending the data to be written.

The home node may also include a snoop controller, where performing the coherence action by the home node comprises exchanging, via the interconnect fabric, one or snoop messages with other nodes of the data processing network.

The write request from the request node may be one of a plurality of write requests a data streaming transaction.

The request node may also include an interface for receiving streaming data from an external input device.

The interconnect fabric may include a mesh network.

A non-transient computer readable medium may be provided for storing instructions of a hardware description language that describe the data processing network or for storing a netlist description of the data processing network.

The invention claimed is:

1. A method of data transfer in a data processing network comprising a home node and a request node coupled via an interconnect fabric, the method comprising:
   receiving, by the home node, a write request from the request node;
   determining whether there is congestion in the interconnect fabric; and
   when it is determined that there is congestion in the interconnect fabric:
   when a data buffer is available at the home node and the home node has completed a coherence action associated with the write request, the home node sending a combined response from the home node to the request node via the interconnect fabric, where the combined response includes an identifier of the data buffer, the identifier generated by the home node, and an indication that the coherence action is complete; and
   when no data buffer is available at the home node or the home node has not completed the coherence action associated with the write request, the home node waiting for the data buffer to become available at the home node and the coherence action to complete.

2. The method of claim 1, further comprising:
   receiving, by the request node, a response to the write request, the response sent from the home node via the interconnect fabric; and
   when the response includes the combined response:
   coalescing, by the request node, a completion acknowledge message with one or more beats of the data to be written to the home node to form one or more coalesced data beats; and
   sending the one or more coalesced data beats from the request node to the home node via the interconnect fabric.

3. A method of data transfer in a data processing network comprising a home node and a request node coupled via an interconnect fabric, the method comprising:
   receiving, by the home node, a write request from the request node;
   determining whether there is congestion in the interconnect fabric; and
   when it is determined that there is congestion in the interconnect fabric:
   sending a combined response from the home node to the request node via the interconnect fabric when a data buffer is available at the home node and the home node has completed a coherence action, where the combined response includes an identifier of the data buffer and an indication that the coherence action is complete, and
   when congestion is not detected in the interconnect fabric:
   sending a first response from the home node to the request node via the interconnect fabric when the data buffer is available at the home node, where the first response includes an identifier of the data buffer; and
   sending a second response to the request node via the interconnect fabric when the home node has completed the coherence action, where the second response includes an indication that the coherence action is complete.

4. The method of claim 3, further comprising:
   receiving, by the request node, a response to the write request, the response sent from the home node via the interconnect fabric;

when the response is the combined response:
  coalescing, by the request node, a completion acknowledge message with one or more beats of the data to be written to the home node to form one or more coalesced data beats; and
  sending the one or more coalesced data beats from the request node to the home node via the interconnect fabric, and
when the response is the first response:
  sending the data to be written as one or more data beats from the request node to the home node via the interconnect fabric; and
  sending the completion acknowledge message from the request node to the home node via the interconnect fabric.

5. The method of claim 1, further comprising:
responsive to the write request from the request node, the home node performing the coherence action comprising exchanging, via the interconnect fabric, one or more snoop messages with other nodes of the data processing network.

6. The method of claim 1, where the write request is one of a plurality of write requests of a data streaming transaction.

7. The method of claim 1, where determining congestion in the interconnect fabric comprises detecting an availability of link credit in the interconnect fabric.

8. The method of claim 1, where determining congestion in the interconnect fabric comprises detecting an availability of data buffers in a cross point of the interconnect fabric.

9. The method of claim 1, where determining congestion in the interconnect fabric is dependent upon a history of backpressure in a response channel of the interconnect fabric.

10. A data processing network comprising:
a home node that provides a point of coherence for a range of region of memory, the home node including a first transaction controller;
a request node including a second transaction controller; and
an interconnect fabric that couples the request node to the home node, the interconnect fabric providing a data channel and a response channel between the first transaction controller and the second transaction controller;
where the request node is configured to send a write request to the home node; and
where the home node is configured for:
  identifying a data buffer of the home node for receiving data associated with the write request;
  performing a coherence action associated with the write request detecting congestion in the response channel of the interconnect fabric;
  when congestion is detected in the response channel of the interconnect fabric:
    waiting for the coherence action to complete;
    sending a combined message to the request node, the combined message includes an identifier of the identified data buffer and an indication that the coherence action is complete when the coherence action associated with the write request is complete,
  and when congestion is not detected in the response channel of the interconnect fabric:
    sending a data buffer identifier (DBID) message for the identified data buffer to the request node;
    waiting for the coherence action to complete; and
    sending a coherence action complete (COMP) message to the request node when the coherence action associated with the write request is complete.

11. The data processing network of claim 10, where the request node is further configured for:
receiving a response to the write request, the response sent from the home node via the interconnect fabric; and
when the response includes the combined message:
  coalescing, by the request node, a completion acknowledge message with one or more beats of data to be written to the home node to form one or more coalesced data beats; and
  sending the one or more coalesced data beats from the request node to the home node via the interconnect fabric.

12. The data processing network of claim 11, where the request node is further configured for:
when the response includes the DBID message:
  sending the data to be written as one or more data beats from the request node to the home node via the interconnect fabric; and
  sending the completion acknowledge message from the request node to the home node via the interconnect fabric subsequent to sending the data to be written.

13. The data processing network of claim 10, where the home node further comprises a snoop controller and where performing the coherence action by the home node includes exchanging, via the interconnect fabric, one or more snoop messages with other nodes of the data processing network.

14. The data processing network of claim 10, where the write request from the request node is one of a plurality of write requests a data streaming transaction.

15. The data processing network of claim 14, where the request node further comprises an interface for receiving streaming data from an external input device.

16. The data processing network of claim 10, where the interconnect fabric comprises a mesh network.

17. A non-transitory computer readable medium storing instructions of a hardware description language that describe the data processing network of claim 10.

18. A non-transitory computer readable medium storing a netlist description of the data processing network of claim 10.

* * * * *